United States Patent
Sabatier et al.

(10) Patent No.: US 11,240,637 B2
(45) Date of Patent: Feb. 1, 2022

(54) METHOD FOR THE TRANSMISSION OF A FRAME BY AN ACCESS POINT OF A WIRELESS LOCAL AREA NETWORK

(71) Applicant: SAGEMCOM BROADBAND SAS, Rueil-Malmaison (FR)

(72) Inventors: Pierre Sabatier, Rueil Malmaison (FR); Romain Dejardin, Rueil Malmaison (FR); Massinissa Lalam, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/954,316

(22) PCT Filed: Dec. 17, 2018

(86) PCT No.: PCT/EP2018/085149
§ 371 (c)(1),
(2) Date: Jun. 16, 2020

(87) PCT Pub. No.: WO2019/121482
PCT Pub. Date: Jun. 27, 2019

(65) Prior Publication Data
US 2021/0037348 A1    Feb. 4, 2021

(30) Foreign Application Priority Data
Dec. 19, 2017 (FR) ...................................... 1762540

(51) Int. Cl.
*H04W 4/06* (2009.01)
*H04W 72/04* (2009.01)
(Continued)

(52) U.S. Cl.
CPC ......... *H04W 4/06* (2013.01); *H04W 72/0446* (2013.01); *H04W 72/0493* (2013.01); *H04W 88/16* (2013.01); *H04W 84/12* (2013.01)

(58) Field of Classification Search
CPC ....................................................... H04W 4/06
See application file for complete search history.

(56) References Cited

U.S. PATENT DOCUMENTS 6,396,814 B1 * 5/2002 Iwamura ............... H04L 12/185
370/230
9,877,323 B1 * 1/2018 Hedayat ............ H04W 72/0453
(Continued)

FOREIGN PATENT DOCUMENTS

| EP | 3229395 A1 | 10/2017 |
| WO | 2013/061009 A1 | 5/2013 |
| WO | 2016/091874 A1 | 6/2016 |

OTHER PUBLICATIONS

Jan. 16, 2019 International Search Report issued in International Patent Application No. PCT/EP2018/085149.

*Primary Examiner* — Jamaal Henson
(74) *Attorney, Agent, or Firm* — Oliff PLC; R. Brian Drozd

(57) ABSTRACT

A wireless communication system has an access point managing a first wireless local area network. To transmit the frame, the access point: obtains data to be transmitted in multicast mode; obtains data to be transmitted in unicast mode; and constructs a physical-layer header including: in a common signalling field, an identification of each channel resource intended to be used for making the frame transmission, whether this be for the data to be transmitted in unicast mode or in multicast mode; and, in each field in a series of specific signalling fields, information representing an association between a channel resource identifier used and a unique identifier of the destination concerned or group (Continued)

of destinations concerned. Thus each destination can determine each channel resource to listen to in order to receive the data that are addressed to it, whether this be in unicast mode or in multicast mode.

17 Claims, 6 Drawing Sheets

(51) Int. Cl.
*H04W 88/16* (2009.01)
*H04W 84/12* (2009.01)

(56) References Cited

U.S. PATENT DOCUMENTS

| | | | | |
|---|---|---|---|---|
| 10,511,419 | B2* | 12/2019 | Zhao | H04L 5/0037 |
| 2012/0155401 | A1* | 6/2012 | Shapira | H04B 7/0617 |
| | | | | 370/329 |
| 2012/0163483 | A1* | 6/2012 | Stacey | H04W 8/186 |
| | | | | 375/260 |
| 2012/0213184 | A1* | 8/2012 | Choi | H04W 4/08 |
| | | | | 370/329 |
| 2013/0301551 | A1* | 11/2013 | Ghosh | H04B 7/066 |
| | | | | 370/329 |
| 2014/0328249 | A1* | 11/2014 | Vermani | H04W 28/065 |
| | | | | 370/328 |
| 2015/0319747 | A1* | 11/2015 | Chu | H04W 72/0406 |
| | | | | 370/330 |
| 2016/0127233 | A1* | 5/2016 | Wentink | H04L 69/22 |
| | | | | 370/392 |
| 2016/0150505 | A1* | 5/2016 | Hedayat | H04L 69/22 |
| | | | | 370/329 |
| 2016/0302229 | A1* | 10/2016 | Hedayat | H04L 1/1685 |
| 2017/0078059 | A1* | 3/2017 | Sun | H04W 72/0453 |
| 2017/0171869 | A1* | 6/2017 | Sun | H04L 5/0053 |
| 2017/0367090 | A1* | 12/2017 | Lim | H04L 5/001 |
| 2018/0199039 | A1* | 7/2018 | Trepte | H04N 19/597 |
| 2018/0255149 | A1* | 9/2018 | Yong | H04W 4/50 |
| 2019/0027113 | A1* | 1/2019 | Kaine | G09G 5/005 |
| 2019/0044549 | A1* | 2/2019 | Pillai | H04W 4/70 |
| 2019/0124638 | A1* | 4/2019 | Lim | H04L 27/2602 |

* cited by examiner

METHOD FOR THE TRANSMISSION OF A FRAME BY AN ACCESS POINT OF A WIRELESS LOCAL AREA NETWORK

FIELD OF THE INVENTION

The present invention relates to a method for the transmission of a frame by an access point of a wireless local area network, the frame enabling data to be sent in unicast mode and in multicast mode.

BACKGROUND

The establishment of wireless local area networks WLAN offers great flexibility to the users of roaming communication devices, such as computers, tablets, smartphones, etc. Such WLAN networks are established by access points AP. Such wireless local area networks WLAN thus facilitate the interconnection of devices within a dwelling or an office, by providing wireless local connectivity in order to avoid having recourse to interconnection cabling.

Wireless local area networks WLAN of the Wi-Fi type are for example known, as defined in IEEE 802.11 and the amendments thereof, such as for example the amendment IEEE 802.11ax.

So as to improve the use of the channel resources, the access point of a network compatible with the IEEE 802.11ax amendment (in the "Draft 2.0" version thereof) can make transmissions of the MU-MIMO type ("Multi-User-Multiple Inputs Multiple Outputs"). This makes it possible, by means of beamforming, to transmit data to a plurality of wireless terminals on the same channel resource. However, when the same data must be transmitted to a plurality of wireless terminals, the use of transmissions of the MU-MIMO type requires duplication of said data, so that each of the spatial streams contains said same set of data. Apart from this duplication of data, the use of transmissions of the MU-MIMO type requires the wireless terminals concerned to be sufficiently distant spatially so as to limit interferences, which is not always possible in the context of a wireless local area network WLAN.

Being able to send data to a plurality of destinations using dedicated link-layer addresses, e.g. Ethernet MAC (medium access control) or network layer (e.g. IP (Internet Protocol), is also known. However, this approach requires performing a link-layer decoding, or respectively network-layer decoding, in order to determine the actual destination of said data.

It is desirable to overcome these drawbacks of the prior art. It is thus desirable to provide a solution that makes it possible to make data transmissions to a plurality of destinations in a wireless local area network WLAN without having to duplicate said data and while limiting the decoding requirements at the link and network layers (and higher layers).

SUMMARY

To this end, the invention relates to a method for the transmission of a frame by an access point of a wireless local area network, the access point having implemented a phase of association with a plurality of wireless terminals. The method is such that the access point receives, during the association phase, from each wireless terminal compatible with transmissions in multicast mode, information indicating that said wireless terminal is compatible with transmissions in multicast mode. And, in order to transmit the frame, the access point performs the following steps: obtaining data to be transmitted in multicast mode to a plurality of destinations from among the compatible wireless terminals; obtaining data to be transmitted in unicast mode to at least one respective destination from among the wireless terminals; constructing a physical-layer header including: in a common signalling field, an identification of each channel resource intended to be used for making the frame transmission whether this be for the data to be transmitted in unicast mode or in multicast mode; in each field of a series of specific signalling fields, information representing an association between a channel resource identifier used and a unique identifier of a destination concerned or of a group of destinations concerned, so that each destination can determine each channel resource to listen to in order to receive the data that are addressed to it, whether it be in unicast mode or in multicast mode. Thus it is possible to transmit data from the access point to a plurality of wireless terminals without having to duplicate data and while remaining at the physical layer in order to identify said data.

According to a particular embodiment, in order to make a transmission in multicast mode to a plurality of destinations, the access point previously performs the following steps: receiving an instruction to create a group from a list of destinations; transmitting a group identifier to each destination of said group. And the series of specific signalling fields is such that, in order to indicate a transmission in multicast mode on a channel resource, a single specific field is defined for said channel resource in which the group identifier is indicated.

According to a particular embodiment, the series of specific signalling fields is such that, in order to indicate a transmission in multicast mode on a channel resource, as many specific signalling fields for said channel resource are included in the physical-layer header as there are destinations of said transmission in multicast mode.

According to a particular embodiment, the physical-layer header indicates that the frame contains data transmitted in multicast mode.

According to a particular embodiment, each specific signalling field indicates that there exists at least one other specific signalling field, subsequent in the physical-layer header, that is associated with the same destination or with at least one destination in the same group of destinations.

According to a particular embodiment, the access point cooperates with a device supplying virtual-reality data having an immersive image in which a plurality of users can immerse themselves by means of wireless terminals displaying respective regions of interest of said immersive image, and the device supplying virtual-reality data requests the access point to transmit in the frame data corresponding to an overlap zone of said regions of interest in multicast mode and the rest of the data of said regions of interest in unicast mode.

According to a particular embodiment, the device supplying virtual-reality data performs the following steps: calculating a cost function relating to the overlap zone; comparing the cost function calculated with a predefined threshold; requesting the access point to transmit the data relating to the overlap zone in multicast mode when the cost function calculated is below the predefined threshold; and requesting the access point to transmit the data relating to the overlap zone in unicast mode when the cost function calculated is below the predefined threshold.

According to a particular embodiment, the cost function is expressed as follows:

$$F = \frac{S_0}{\sum_{n=1}^{N} S_n}$$

where N represents the quantity of regions of interest in question, $S_0$ represents the size of the overlap zone, and $S_n$, $\forall 1 \leq n \leq N$, represents the size of the regions of interest indexed by n.

According to a particular embodiment, the device supplying virtual-reality data makes an alignment of the overlap zone on macroblock boundaries.

According to a particular embodiment, when a first set of wireless terminals has regions of interest that overlap and define a first overlap zone and a second set of wireless terminals has regions of interest that overlap with each other but which do not overlap with the regions of interest in the first set, the device supplying virtual-reality data determines the overlap zone and calculates the cost function independently for each set of wireless terminals.

According to a particular embodiment, when a first set of wireless terminals has regions of interest that overlap and define an overlap zone and a second set of wireless terminals has regions of interest that do not overlap with each other and which also do not overlap with the regions of interest of the first set, the device supplying virtual-reality data determines the overlap zone and calculates the cost function only for the first set of wireless terminals, and requests the access point to transmit, in unicast mode, the data of the region of interest of each wireless terminal in the second set.

According to a particular embodiment, the device supplying virtual-reality data performs the following steps: taking the regions of interest two by two and determining any overlap zone thereof; determining a sorted list of the regions of interest according to the overlap zones determined, so that the first two elements of the list have the largest overlap zone, and the regions of interest are next sorted by successively adding to the list the region of interest that has the largest overlap zone with the last element in the list; performing at least one iteration of the following steps: determining any overlap zone common to all the regions of interest present in the list; calculating a cost function for the common overlap zone determined and, if no common overlap zone has been able to be determined, considering the cost function as being above a predefined threshold; deciding that a transmission in multicast mode is possible for the data of the common overlap zone when the cost function is below the predefined threshold; excluding from the list the region of interest iterated in the last position when the cost function is above or equal to the predefined threshold and performing a new iteration.

According to a particular embodiment, the device supplying virtual-reality data is a residential gateway.

According to a particular embodiment, the frame is transmitted by the access point in accordance with an OFDMA technique.

According to a particular embodiment, the wireless local area network is of the Wi-Fi type.

The invention also relates to an access point of a wireless local area network, the access point being adapted to perform a frame transmission in said wireless local area network, the access point having implemented a phase of association with a plurality of wireless terminals. The access point comprises means for receiving, during the association phase, from each wireless terminal compatible with transmissions in multicast mode, information indicating that said wireless terminal is compatible with transmissions in multicast mode; and, to transmit the frame, the access point comprises: means for obtaining data to be transmitted in multicast mode to a plurality of destinations from among the compatible wireless terminals; means for obtaining data to be transmitted in unicast mode to at least one respective destination from among the wireless terminals; means for constructing a physical-layer header including: in a common signalling field, an identification of each channel resource intended to be used for making the frame transmission, whether this be for the data to be transmitted in unicast mode or in multicast mode; in each field in a series of specific signalling fields, information representing an association between a channel resource identifier used and a unique identifier of the destination concerned or group of destinations concerned, so that each destination can determine each channel resource to listen to in order to receive the data that are addressed to it, whether this be in unicast mode or in multicast mode.

The invention also relates to a computer program product comprising instructions for implementing, by a processor, the above method, when said program is executed by said processor. The invention also relates to an information storage medium storing a computer program comprising instructions for implementing, by a processor, the above method, when said program is executed by said processor.

The features of the invention mentioned above, as well others, will emerge more clearly from a reading of the following description of at least one example embodiment, said description being made in relation to the accompanying drawings, among which:

DETAILED DESCRIPTION

Figure 1:
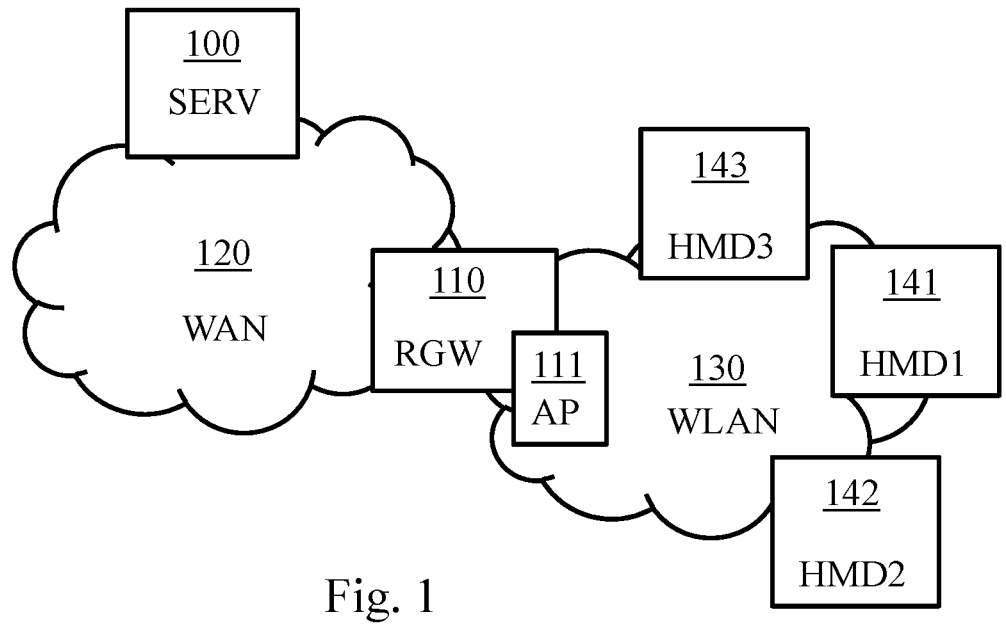
FIG. 1 illustrates schematically a communication system wherein the present invention can be implemented.

FIG. 1 illustrates schematically a communication system wherein the present invention can be implemented.

The communication system comprises a residential gateway RGW 110 cooperating with an access point AP 111. The access point AP 111 is preferentially integrated in the residential gateway RGW 110. The access point AP 111 establishes a wireless local area network WLAN 130 to which a plurality of wireless terminals are able to connect, by implementing a phase of association with the access point AP 111. These wireless terminals are consumers of data supplied by the residential gateway RGW 110 by means of the access point AP 111. Such wireless terminals are for example virtual-reality terminals adapted for immersing users in a virtual-reality environment. More particularly, these wireless terminals are for example immersive headsets or pairs of immersive glasses, which are equipped with one or more integrated screens arranged so as to be placed in front of the eyes of the user wearing them. For example, in the case of immersive glasses, a screen faces each eye of the user. Devices of the HMD (head mounted display) type are more generally spoken of. Three terminals HMD1 141, HMD2 142, HMD3 143 are thus depicted by way of illustration in FIG. 1. These three wireless terminals are then intended to receive data, more particularly encoded image portions in the case of virtual reality terminals, coming from the residential gateway RGW 110 by means of the access point AP 111.

Preferentially, the wireless local area network WLAN 130 is of the Wi-Fi type.

The data that are supplied by the residential gateway RGW 110 to the wireless terminals may be generated by the residential gateway RGW 110 itself, or recovered in memory by the residential gateway RGW 110, or received by the residential gateway RGW 110 from a third item of equipment. For example, these data come from a server SERV 100 via a wide area network WAN 120.

The residential gateway RGW 110 is a preferential illustrative example of the supply of data to a plurality of wireless terminals in the wireless local area network WLAN 130. Other implementations of data-supplying devices are possible in the context of the present invention, such as for example a multimedia player, such as a Blu-Ray disc player, or a data server of the NAS (Network Attached Storage) type, or a game console.

Figure 2:
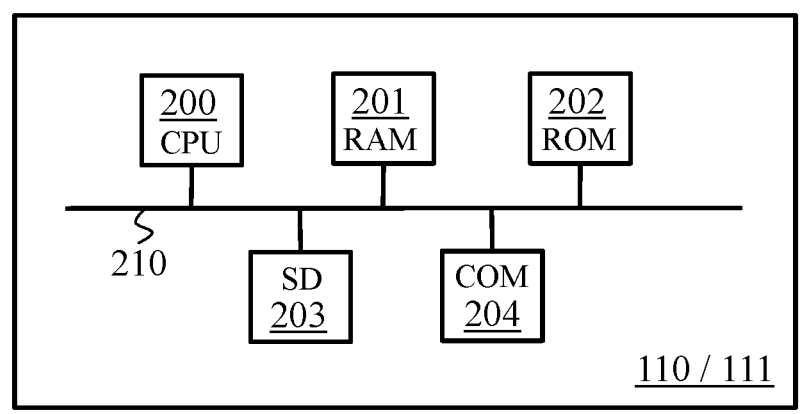
FIG. 2 illustrates schematically an example of hardware architecture of a communication device of the communication system.

FIG. 2 illustrates schematically an example of hardware architecture of a communication device of the communication system. This communication device is the residential gateway RGW 110, or the access point AP 111, or the residential gateway RGW 110 including the access point AP 111.

The communication device in question comprises, connected by a communication bus 210: a processor CPU (central processing unit) 200; a random access memory RAM 201; a read only memory ROM 202; a storage unit or a storage medium reader, such as an SD (Secure Digital) card reader 203 or a hard disk HDD (hard disk drive); and at least one communication interface COM 204.

When the hardware architecture represents the residential gateway RGW 110, the communication interface COM 204 enables the residential gateway RGW 110 to communicate and cooperate with the access point AP1 111, in order to communicate within the wireless local area network WLAN 130. The communication interface COM 204 also enables the residential gateway RWG 110 to communicate via the wide area network WAN 120, in particular with the server SERV 100.

When the hardware architecture represents the access point AP1 111, the communication interface COM 204 enables the access point AP1 111 to manage the wireless local area network WLAN 130 and to communicate via the wireless local area network WLAN 130 with wireless terminals. The communication interface COM 204 also enables the access point AP1 111 to communicate and cooperate with the residential gateway RGW 110, in order to enable the residential gateway RGW 110 to communicate within the wireless local area network WLAN 130.

When the hardware architecture represents the residential gateway RGW 110 including the access point AP1 111, the communication interface CM 204 enables the residential gateway RGW 110 to communicate via the wide area network WAN 120, in particular with the server SERV 100. The communication interface COM 204 also enables the residential gateway RGW 110, by means of the access point AP1 111 thereof, to manage the wireless local area network WLAN 130 and to communicate via the wireless local area network WLAN 130 with wireless terminals.

The processor CPU 200 is capable of executing instructions loaded in the RAM memory 201 from the ROM memory 202, from an external memory (such as an SD card), from a storage medium (such as a hard disk HDD), or from a communication network (such as the wide area network WAN 120). On powering up, the processor CPU 200 is capable of reading instructions from the RAM memory 201 and executing them. These instructions form a computer program causing the implementation, by the processor CPU 200, of all or some of the algorithms and steps described below in relation to the device that said hardware architecture represents.

Thus all or some of the algorithms and steps described below can be implemented in software form by the execution of a set of instructions by a programmable machine, such as a DSP (digital signal processor) or a microcontroller or a processor. All or some of the algorithms and steps described below can also be implemented in hardware form by a machine or a dedicated component, such as an FPGA (field-programmable gate array) or an ASIC (application-specific integrated circuit). Thus the residential gateway RGW 110 and/or the access point AP1 111 comprise electronic circuitry adapted for implementing the algorithms and steps described below.

Figure 3A:
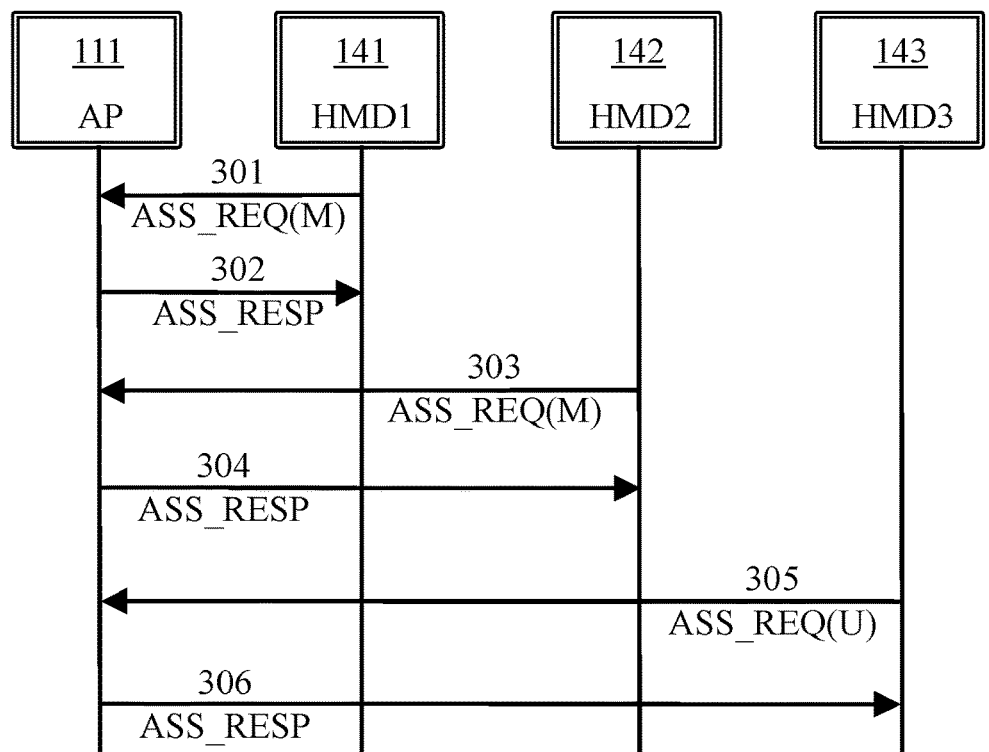
FIG. 3A illustrates schematically exchanges, between an access point and wireless terminals, in the context of an association phase in the communication system.

FIG. 3A illustrates schematically exchanges, between the access point AP 111 and wireless terminals, such as the terminals HMD1 141, HMD2 142, HMD3 143, in the context of an association phase in the communication system.

In a step 301, the wireless terminal HMD1 141 detects the wireless local area network WLAN 130 by means for example of beacons sent by the access point AP1 111, and sends an association request ASS_REQ to the access point AP1 111 so as to be connected to the wireless local area network WLAN 130. The association request ASS_REQ contains information M indicating that the wireless terminal HMD1 141 is compatible, as a wireless receiver, with transmissions in multicast mode.

In a step 302, the access point AP 111 responds to the association request ASS_REQ by means of a response ASS_RESP. The response ASS_RESP preferentially includes a unique association identifier AID (Association IDentifier) for the wireless terminal HMD1 141 in the wireless local area network WLAN 130. The access point AP 111 thus allocates a physical address to the wireless terminal HMD1 141 so as in particular to subsequently enable the wireless terminal HMD1 141 to locate, in frames transmitted by the access point AP 111, which are the data that are specifically addressed to the wireless terminal HMD1 141. Following the step 302, the access point AP 111 stores the fact that the wireless terminal HMD1 141 is connected and is compatible, as a wireless receiver, with transmissions in multicast mode. The access point AP 111 informs the residential gateway RGW 110 thereof.

In a step 303, the wireless terminal HMD2 142 also detects the wireless local area network WLAN 130 and sends an association request ASS_REQ to the access point AP1 111 so as to be connected to the wireless local area network WLAN 130. The association request ASS_REQ contains the information M indicating that the wireless terminal HMD2 142 is compatible, as a wireless receiver, with transmissions in multicast mode.

In a step 304, the access point AP 111 responds to the association request ASS_REQ by a response ASS_RESP. The response ASS_RESP preferentially includes a unique association identifier AID for the wireless terminal HMD2 142 in the wireless local area network WLAN 130. Following the step 304, the access point AP 111 stores the fact that the wireless terminal HMD2 142 is connected and is compatible, as a wireless receiver, with transmissions in multicast mode. The access point AP 111 informs the residential gateway RGW 110 thereof.

In a step 305, the wireless terminal HMD3 143 also detects the wireless local area network WLAN 130, and sends an association request ASS_REQ to the access point AP1 111 so as to be connected to a wireless local area network WLAN 130. The association request ASS_REQ does not contain the information M indicating that the wireless terminal HMD3 143 would be compatible, as a wireless receiver, with transmissions in multicast mode. In a variant, the association request ASS_REQ contains information indicating that the wireless terminal HMD3 143 is compatible only with transmissions in unicast mode and optionally with broadcast transmissions.

In a step 306, the access point AP 111 responds to the association request ASS_REQ by a response ASS_RESP. The response ASS_RESP preferentially includes a unique association identifier AID for the wireless terminal HMD3 143 in the wireless local area network WLAN 130. Following the step 306, the access point AP 111 stores the fact that the wireless terminal HMD3 143 is connected and is not compatible, as a wireless receiver, with transmissions in multicast mode. The access point AP 111 informs the residential gateway RGW 110 thereof.

Other procedures between the access point AP 111 and the wireless terminals may follow the association phase, such as for example authentication procedures. It is furthermore possible for the access point AP 111 to indicate, in each beacon sent, or during exchanges with the wireless terminals (for example in the context of the association phase), that the access point AP 111 has the capability of making transmissions in multicast mode.

The residential gateway RGW 110 is thus informed that the wireless terminals HMD1 141, HMD2 142, HMD3 143 are connected to the local wireless area network WLAN 130, and of their respective capabilities vis-à-vis transmissions in multicast mode. The residential gateway RGW 110 identifies the fact that the wireless terminals HMD1 141, HMD2 142, HMD3 143 are destinations of data supplied by said residential gateway RGW 110. For example, an application, such as a virtual-reality application, is implemented on the residential gateway RGW 110, and the wireless terminals HMD1 141, HMD2 142, HMD3 143 are of a type compatible with said application.

As detailed below, two approaches for identifying data transmitted in multicast mode are proposed. A first approach consists of relying on a list of identifiers of the wireless terminals to which said data are addressed. The identifiers AID mentioned above are preferentially used to do this. A second approach consists of relying on group identifiers MID (Multicast IDentifiers).

Figure 3B:
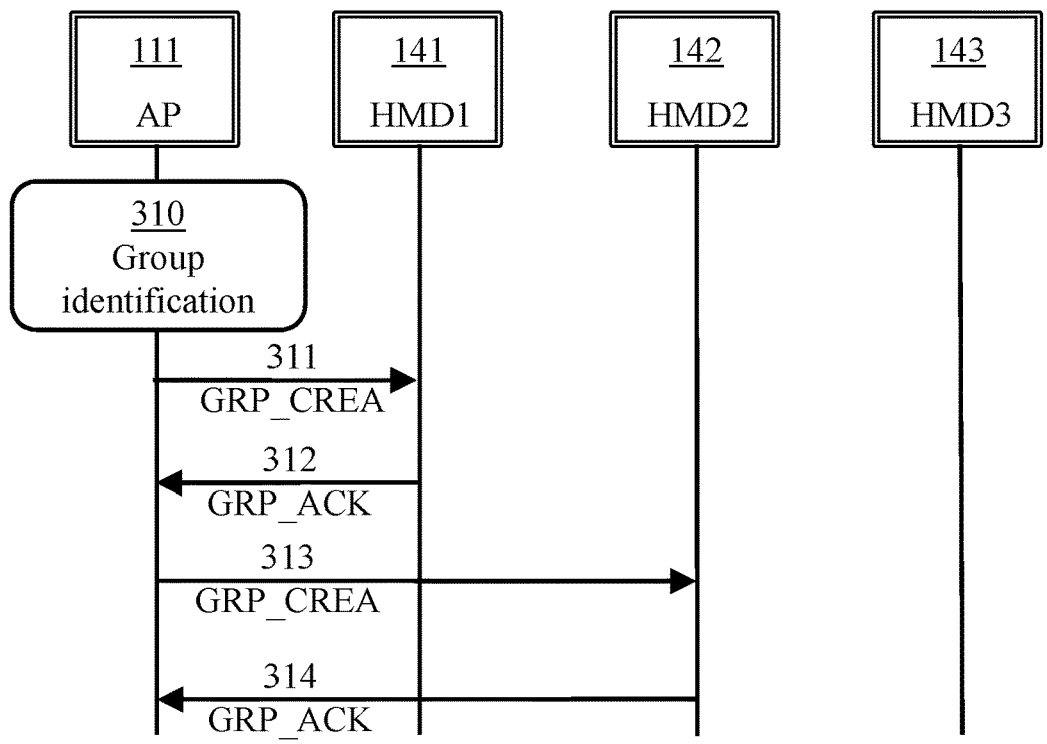
FIG. 3B illustrates schematically exchanges, between the access point and wireless terminals, in the context of a group definition in the communication system.

FIG. 3B illustrates schematically exchanges, between the access point AP 111 and wireless terminals, such as the terminals HMD1 141, HMD2 142, HMD3 143, in the context of a group definition in the communication system.

The residential gateway RGW 110 orders the access point AP 111 to create a group for the wireless terminals HMD1 141, HMD2 142 following the exchanges described above in relation to FIG. 3A. Thus, in a step 310, the access point AP 111 identifies the fact that a new group must be created for the terminals HMD1 141, HMD2 142. The terminal HMD3 143 is in fact excluded from the group, because of its inability to receive data by transmission in multicast mode according to the exchanges described above in relation to FIG. 3A.

In a step 311, the access point AP 111 transmits to the terminal HMD1 141 a group-creation notification message GRP_CREA including a group identifier MID. The access point AP 111 thus allocates to the group in question an equivalent of a physical address, so as to subsequently enable the wireless terminal HMD1 141 to locate, in frames transmitted by the access point AP 111, which are the data that are addressed to the group in question, to which the wireless terminal HMD1 141 belongs. In a particular embodiment, the group identifier MID is to the same format as the aforementioned identifiers AID and has a value distinct from the identifiers AID allocated uniquely to the wireless terminals of the wireless local area network WLAN 130 (and a value distinct from any other group previously created by the access point AP 111). In other words, the access point AP 111 draws the identifiers AID and MID from a common pool of identifiers and attributes them uniquely.

In a step 312, the terminal HMD1 141 transmits an acknowledgement message GRP_ACK to the access point AP 111 in response to the group-creation notification message GRP_CREA of the step 311.

In a step 313, the access point AP 111 transmits to the terminal HMD2 142 a group-creation notification message GRP_CREA in which the access point AP 111 includes the same group identifier MID as for the terminal HMD1 141.

In a step 314, the terminal HMD2 142 transmits an acknowledgement message GRP_ACK to the access point AP 111 in response to the group-creation notification message GRP_CREA of the step 313.

The access point AP 111 informs the residential gateway RGW 110 of the correct conduct of the group creation and shares with the residential gateway RGW 110 information for identifying the group in question. For example, the access point AP 111 supplies to the residential gateway RGW 110 the group identifier MID attributed.

In a particular embodiment, when the residential gateway RGW 110 detects that more than two wireless terminals are destinations of data supplied by said residential gateway RGW 110, said residential gateway RGW 110 requests the access point AP 111 to create a multitude of groups so as to be able to transmit data in multicast mode to various sets of wireless terminals among said wireless terminals connected to the wireless local area network WLAN 130. For example, the residential gateway RGW 110 requests the access point AP 111 to create as many groups as there are possible groupings between said wireless terminals, which amounts to a quantity of groups defined by:

$$\sum_{n=2}^{N} C_N^n = \sum_{n=2}^{N} \frac{n!}{N!(N-n)!}$$

where N represents the quantity of wireless terminals that are destinations of said data supplied by the residential gateway RGW 110. The residential gateway RGW 110 can choose to create only certain groups among all the possible groups, and therefore to consider being able to make transmissions in multicast mode only among these chosen groups.

Figure 4:
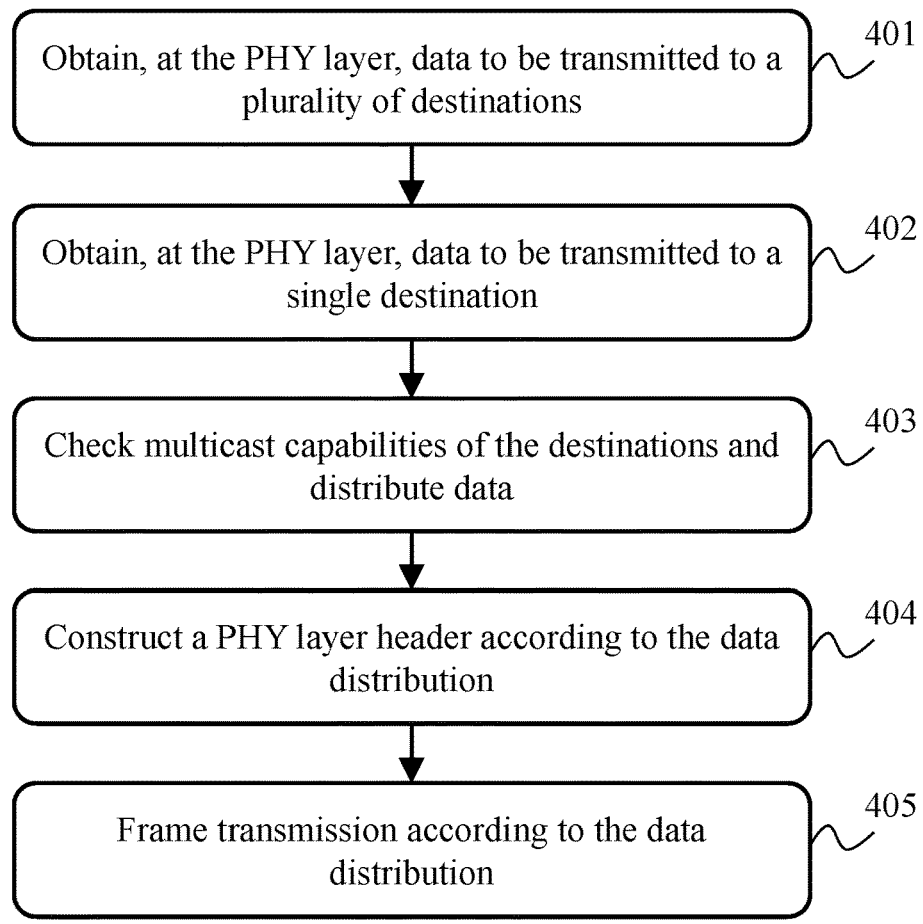
FIG. 4 illustrates schematically an algorithm for transmission of frames by the access point.

FIG. 4 illustrates schematically an algorithm for frame transmission by the access point AP 111.

In a step 401, the access point AP 111 obtains, at the physical layer (PHY) thereof, data to be transmitted to a plurality of destinations. These data come from higher layers of the access point AP 111 and were previously supplied to the access point AP 111 by the residential gateway RGW 110. The residential gateway RGW 110 also previously indicated to the access point AP 111 which are the wireless terminals that are destinations of said data. If a group has previously been created for said destinations, the residential gateway RGW 110 uses the group identifier MID shared with the access point AP 111, to designate the destinations in question. A list of identifiers of the destinations in question may also be used, the access point AP 111 being in the position to find to which group these destinations correspond.

In a step 402, the access point AP 111 obtains, at the physical layer (PHY) thereof, data to be transmitted to unique destinations, and therefore to be transmitted in unicast mode. These data come from higher layers of the access point AP 111 and were previously supplied to the access point AP 111 by the residential gateway RGW 110. The residential gateway RGW 110 also previously informed the access point AP 111 of the wireless terminals that are unique destinations of said data.

It should be noted that data to be transmitted in multicast mode obtained at the step 401 and/or data to be transmitted in unicast mode obtained at the step 402 may have been supplied to the access point AP 111 by one or more items of equipment in the communication system other than the residential gateway RGW 110. The access point AP 111 in fact makes the downlink transmissions for the entire coverage of the wireless local area network WLAN 130.

In an optional step 403, the access point AP 111 checks the capabilities, vis-à-vis transmissions in multicast mode, of each destination to which the data obtained at the step 401 relate. If the access point AP 111 realises that one or more destinations do not have the capabilities to receive transmissions in multicast mode, the access point AP 111 considers that the data in question must be duplicated and transmitted in unicast mode to each destination thus concerned. A new distribution of data is thus established (more data to be transmitted in unicast mode). The other destinations may however receive the data in question in accordance with a transmission in multicast mode. It should be noted that using a group identifier MID shared between the residential gateway RGW 110 and the access point AP 111 makes it possible to dispense with this step 403. It should also be noted that this check may be made upstream by the residential gateway RGW 110.

In a step 404, the access point AP 111 constructs a physical-layer (PHY) header adapted for making a transmission in unicast mode of the data obtained at the step 402 and a transmission in multicast mode of the data obtained at the step 401 (taking into account any new distribution resulting from the optional step 403). The physical-layer (PHY) header indicates which channel resources are used for transmitting data that are addressed to a single destination and identifies which this destination is, and indicates which channel resources are used for transmitting data that are addressed to a plurality of destinations and identifies which these destinations are or to which group of destinations said data are addressed. It is advantageous to indicate, in the physical-layer (PHY) header, which are the channel resources used for the transmissions in unicast mode and the channel resources used for the transmissions in multicast mode, since this avoids each destination having to perform decodings of higher layers (link layer, network layer, etc.) in order to determine which are the data to be recovered in the frame by said destination.

Preferentially, the access point AP 111 uses a formatting of a physical-layer (PHY) header in accordance with the IEEE 802.11ax amendment relating to the IEEE 802.11 standard (defining what is commonly referred to as "Wi-Fi technology"). Developments are implemented with respect to the IEEE 802.11ax amendment ("Draft 2.0" version), in order to support the transmissions in multicast mode, as detailed below in relation to FIG. 5.

In a step 405, the access point AP 111 makes the frame transmission including the header constructed at the step 404 and the data obtained at the steps 402 and 403. The data obtained at the steps 402 and 403 are transmitted on the channel resources identified in the physical-layer header. For example, the transmissions are made in accordance with an OFDMA (Orthogonal Frequency-Division Multiple Access) technique.

Figure 5:
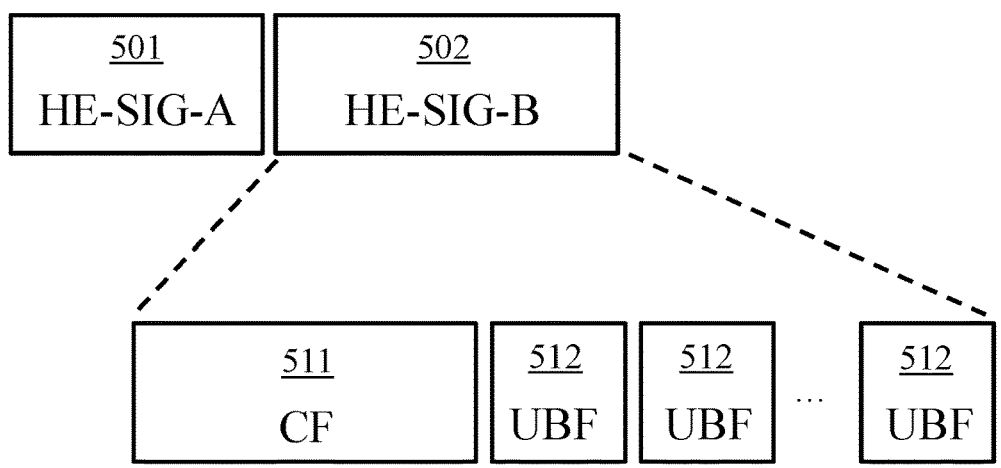
FIG. 5 illustrates schematically a physical-layer header structure used for the transmission of frames, in a particular embodiment.

FIG. 5 illustrates schematically a physical-layer (PHY) header structure used for the transmission of frames by the access point AP 111, in a particular embodiment.

In this particular embodiment, the physical-layer (PHY) multi-user header format of the IEEE 802.11ax amendment ("Draft 2.0" version) is used. According to this format, the physical-layer (PHY) header comprises two signalling fields HE-SIG-A 501 and HE-SIG-B 502. The physical-layer (PHY) header comprises other fields, not depicted.

The signalling field HE-SIG-A 501 is intended to supply information common to all the wireless terminals, in particular information on bandwidth used (20 MHz; 40 MHz; 80 MHz), information on the modulation and coding scheme (MCS) used for the signalling field HE-SIG-B 502, the size of the HE-SIG-B 502 signalling field in symbols, and information indicating whether the transmission is taking place in SU-MIMO (Single User-Multiple Inputs Multiple Outputs) mode or in MU-MIMO mode.

It should be noted that the MU-MIMO transmission concept is distinct from the multicast mode transmission concept addressed in the present document. This is because the concept of transmission in multicast mode means that the same set of data is transmitted only once to various destinations (without duplication), whereas the concept of MU-MIMO transmission means that a plurality of simultaneous transmissions are made to distinct destinations using distinct spatial streams, which means that, in order to transmit the same set of data to a plurality of destinations, duplications are made so that these spatial streams contain said same set of data.

The signalling field HE-SIG-B 502 is intended to supply complementary information to the signalling field HE-SIG-A 501, specific to the destinations of the data (of higher layers) included in the frame. More particularly, the signalling field HE-SIG-B 502 is composed of a common field CF 511 and a series of specific fields, called user fields UBF (user block fields) 512. The common field CF 511 notifies which channel resources are used for transmitting said data (of higher layers) to said destinations, whether it be in unicast mode or in multicast mode. The series of user fields UBF 512 serves in particular to indicate the association made between channel resources (also called RU (Resource Unit)) and destinations of the data transported in these channel resources listed in the common field CF 511. Each user field UBF 512 is formatted in the IEEE 802.11ax amendment ("Draft 2.0" version) so that a single association identifier AID can be specified for the resource channel concerned.

According to a first embodiment, each of the user fields UBF 512 supplies an association between a unique channel resource identifier and a unique wireless terminal identifier, so that the same channel resource is identified in a plurality of user fields UBF 512 when said channel resource is used in multicast mode. The association identifier AID is preferentially used as a wireless terminal identifier. Thus, when a plurality of destinations must recover the data transmitted on the same channel resource, the physical-layer (PHY) header contains as many user fields UBF 512 associated with this channel resource as there are destinations of the data transmitted on this channel resource. In a preferential embodiment, the common field CF 511 further indicates how many destinations are addressed for each channel resource used for transmitting said data.

According to a second embodiment, each of the user fields UBF 512 supplies an association between a unique channel resource identifier and a unique wireless terminal identifier, so that each channel resource used is identified in only one user field UBF 512, even when said channel resource is used in multicast mode. This second mode relies on the aforementioned group identifiers MID. Thus each destination compatible, as a receiver, with the transmissions in multicast mode seeks at least two identifiers in the user fields UBF 512: its own identifier AID and each group identifier MID that was communicated to it by the access point AP 111 (see FIG. 3B. It is in this case not necessary to indicate in the common field CF 511 how many destinations are addressed for each channel resource used for transmitting said data.

The user fields UBF 512 are thus formatted so that each destination can determine each channel resource to listen to in order to receive the data that are addressed to it, whether it be in unicast mode or in multicast mode.

It may furthermore be desirable to indicate, in the physical-layer (PHY) header, that the frame is a frame containing data transmitted in multicast mode.

This indication may be done in the signalling field HE-SIG-A 501, for example using the bit B7 of its signalling sub-field HE-SIG-A2 indicated as "reserved" in the IEEE 802.11ax amendment ("Draft 2.0" version) for the transmissions to the multi-user format (HE MU PPDU, standing for "High Efficiency Multi-User PLCP Protocol Data Unit", where "PLCP" signifies "Physical Layer Convergence Procedure"). Thus, when said bit B7 is set to 1, this means that the frame relates only to transmissions in unicast mode or transmissions in broadcast mode; and, when the bit B7 is set to 0, this means that the frame concerns at least one transmission in multicast mode.

In a variant embodiment, the indication that the frame contains data transmitted in multicast mode can be included in each user field UBF 512 concerned, for example using the bit B19 indicated as "reserved" in the IEEE 802.11ax amendment ("Draft 2.0" version). Thus, when the bit B19 is set to 0, this means that the channel resource identified by the user field UBF 512 in question concerns a transmission in unicast mode or a transmission in broadcast mode; and when the bit B19 is set to 1, this means that the channel resource identified by the user field UBF 512 in question concerns at least one transmission in multicast mode. It should be noted that the two variants presented above may be added together. One advantage of the approach using said bit B19 is to avoid situations where a wireless terminal that is not compatible with multicast transmissions rejects the frame because of said bit B7 of the signalling sub-field HE-SIG-A2 that would not have the expected reserved value.

According to another aspect, said bit B19 can serve to indicate that there exists at least one other channel resource associated with the same wireless terminal as the one identified in the user field UBF 512 in question or that there exists at least one other channel resource associated with a wireless terminal belonging to the group identified in the user field UBF 512 in question. This makes it possible in particular to indicate to each wireless terminal concerned that it is necessary to continue to scrutinise the rest of the physical-layer header in order to identify one or more other channel resources used for transmitting data to said wireless terminal. In general, this makes it possible to allocate non-contiguous channel resources to the same wireless terminal. To do this, when the access point AP 111 creates a user field UBF 512, the access point AP 111 checks whether there still exists at least one other channel resource not yet declared in the user field or fields UBF 512 defined up until then for the frame in question, attributed to at least one wireless terminal identified in said user field UBF 512 being created. If such is the case, the access point AP 111 sets said bit B19 to 1; otherwise the access point AP 111 sets said bit B19 to 0. In other words, each user field UBF 512 indicates whether there exists at least one other user field UBF 512, subsequent in the physical-layer header, which is associated with the same destination or with at least one destination in the same group of destinations. One advantage of this other aspect is that, even for unicast transmissions solely, non-contiguous channel resources can be allocated and indicated to a destination, in order for example to avoid certain interfered channel resources for this destination. The latter can, when it arrives at the decoding of the last user field UBF 512 being addressed to it (said bit B19 at 0), stop decoding the signalling field HE-SIG-B and thus save on time and energy resources.

In the light of the above, it is thus possible to make transmissions in multicast mode in a wireless local area network WLAN. A context of use of the mechanisms detailed above is presented below in relation to FIGS. 6 to 9.

Figure 6:
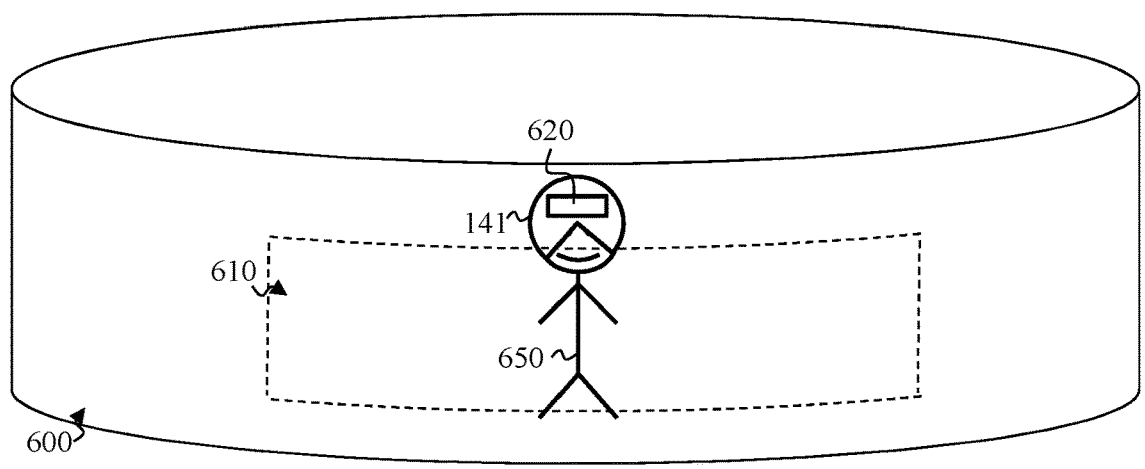
FIG. 6 illustrates schematically an environment of use of a virtual-reality wireless terminal.

FIG. 6 illustrates schematically an environment for use of a virtual-reality wireless terminal, such as the terminals HMD1 141, HMD2 142 and HMD3 143. The residential gateway RGW 110 in this context serves as a supplier of data relating to an immersive image 600. The residential gateway RGW 110 defines a simple geometric shape (here a hollow cylinder, but other shapes are possible, such as a half sphere or a dome) on which the immersive image 600 is pressed virtually. Each user 650 carrying one of the terminals HMD1 141, HMD2 142 and HMD3 143 sees, at each instant, by means of a display 620 of the terminal HMD1 141, HMD2 142 or HMD3 143 in question, only one portion 610 of the immersive image 600. When the user 650 moves his head, that is to say the user 650 changes point of view, another portion of the immersive image 600 is displayed for him by the terminal HMD1 141, HMD2 142 or HMD3 143 in question. Typically, when a plurality of users are immersed in virtual reality, each user has his own point of view, and therefore different portions of the immersive image 600 are respectively displayed for them. Different "regions of interest" ROI are spoken of. Each of these regions of interest ROI is defined according to the information representing the point of view observed by the user in question in the immersive image 600. One way of defining such a point of view in the immersive image 600 is to provide an azimuth, an angle of elevation and a distance with respect to a predefined position in space following a calibration operation. This information representing the point of view observed is transmitted in real time by the terminals HMD1 141, HMD2 142 and HMD3 143 to the residential gateway RGW 110 via the wireless local area network WLAN 130. Consequently the residential gateway RGW 110 determines which are the corresponding regions of interest ROI and transmits, to the terminals HMD1 141, HMD2 142 and HMD3 143, via the access point AP 111, data of the immersive image 600 that enable each of the terminals HMD1 141, HMD2 142 and HMD3 143, after decoding, to display the region of interest ROI in question to their user.

These various regions of interest ROI do however generally have an overlap zone between them, or between some of them, as detailed below in relation to FIGS. 7A and 7B.

Figure 7A:
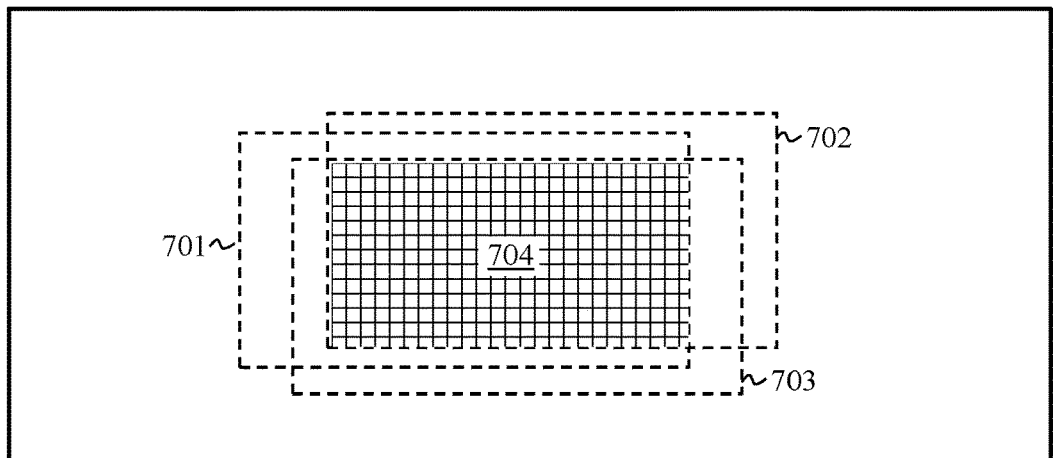
FIG. 7A illustrates schematically a first example of overlap of regions of interest of a plurality of virtual-reality wireless terminals.

FIG. 7A illustrates schematically a first example of overlap of regions of interest ROI of a plurality of virtual-reality wireless terminals, such as the terminals HMD1 141, HMD2 142 and HMD3 143.

In FIG. 7A, there is the immersive image 600, unfolded so as to appear in a plane. It is supposed that, in FIG. 7A, three users are using respectively the terminals HMD1 141, HMD2 142 and HMD3 143, and are viewing different regions of interest ROI in the immersive image 600. A region of interest ROI 701 is defined for the terminal HMD1 141, a region of interest ROI 702 is defined for the terminal HMD2 142, and a region of interest ROI 703 is defined for the terminal HMD3 143. These three regions of interest ROI 701, 702 and 703 have in common an overlap zone 704. Thus, since the three terminals HMD1 141, HMD2 142 and HMD3 143 have declared themselves compatible with transmissions in multicast mode (see FIG. 3A), the data corresponding to this overlap zone 704 can be transmitted in unicast mode, whereas the data corresponding to the rest of the three regions of interest RPO 701, 702 and 703 are to be transmitted in unicast mode.

Figure 7B:
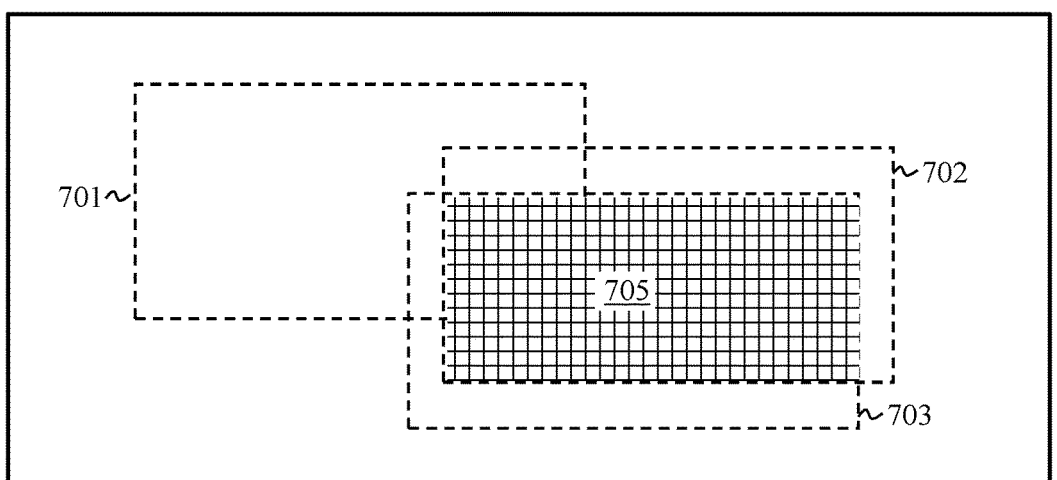
FIG. 7B illustrates schematically a second example of overlap of regions of interest of a plurality of virtual-reality wireless terminals.

FIG. 7B illustrates schematically a second example of overlapping of regions of interest of a plurality of virtual-reality wireless terminals, such as the terminals HMD1 141, HMD2 142 and HMD3 143. The three regions of interest ROI 701, 702 and 703 are found therein in the immersive image 600, with positions different from those in FIG. 7A. The overlap zone of the three regions of interest ROI 701, 702 and 703 is then much smaller than in FIG. 7A, whereas the regions of interest ROI 702 and 703 have a much larger overlap zone 705. It may then be advantageous to transmit in multicast mode the data corresponding to this overlap zone 705 and to transmit in unicast mode the data corresponding to the rest of the regions of interest ROI 702 and 703, as well as all the data corresponding to the region of interest ROI 701.

The modes for transmission, by the access point AP 111, of data supplied by the residential gateway RGW 110 to the terminals HMD1 141, HMD2 142 and HMD3 143 are thus adapted according to an overlap between the regions of interest ROI 701, 702 and 703. This aspect is detailed below in relation to FIGS. 8 and 9.

Figure 8:
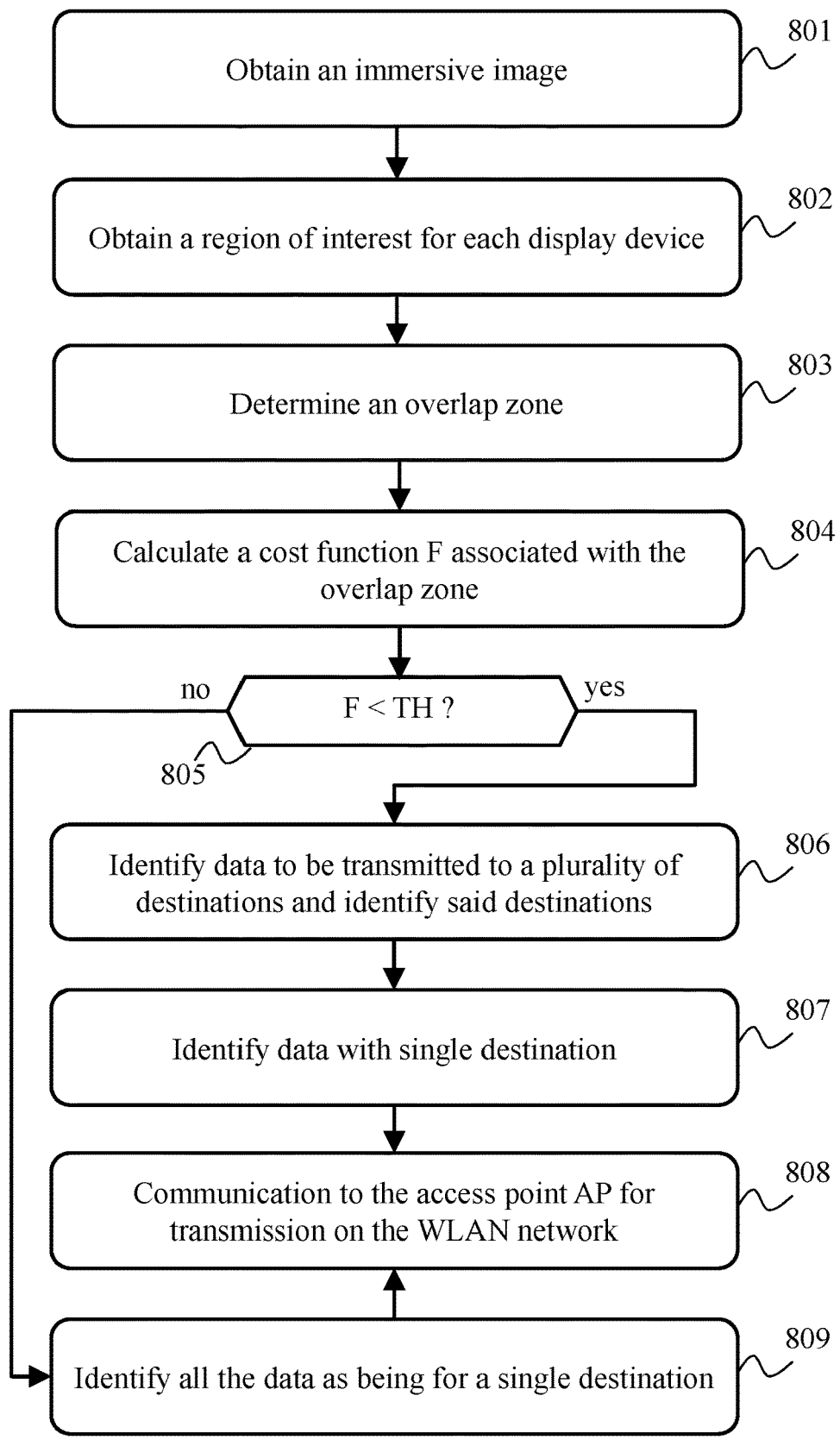
FIG. 8 illustrates schematically an algorithm for distribution of data by a device supplying virtual-reality content.

FIG. 8 illustrates schematically an algorithm for the distribution of data by a device supplying virtual-reality content, such as the residential gateway RGW 110. A plurality of wireless terminals of the wireless local area network WLAN 130 make it possible to immerse the same number of users simultaneously in the virtual-reality context corresponding to the immersive image 600. The algorithm in FIG. 8 is executed vis-à-vis the wireless terminals that have declared they are compatible, as receivers, with transmissions in multicast mode. For the non-compatible wireless terminals, the residential gateway RGW 110 requests, from the access point AP 111, a transmission in unicast mode of the data corresponding to all their regions of interest ROI. It is considered here, by way of illustration, that the terminals HMD1 141, HMD2 142 and HMD3 143 are all compatible, as destinations, with transmissions in multicast mode.

In a step 801, the residential gateway RGW 110 obtains the immersive image 600. The immersive image 600 is not encoded, or, if the immersive image 600 is received encoded from the server SERV 100, the residential gateway RGW 110 decodes said immersive image 600.

In a step 802, the residential gateway RGW 110 obtains a region of interest ROI for each wireless terminal used in the virtual-reality context corresponding to the immersive image 600.

In a step 803, the residential gateway RGW 110 determines an overlap zone of the regions of interest ROI, such as the overlap zone 704 in FIG. 7A.

In a particular embodiment, the residential gateway RGW 110 adjusts the overlap zone of the regions of interest ROI by making an alignment of said overlap zone on boundaries of macroblocks in the immersive image 600, so that the adjusted overlap zone is the smallest portion of the immersive image 600 aligned on the macroblock boundaries that encompass the actual overlap zone of the regions of interest ROI.

In a step 804, the residential gateway RGW 110 calculates a cost function F for the overlap zone determined at step 803. The cost function represents an actual gain in bandwidth, obtained using the multicast mode combined with the unicast mode, in order to transmit the data of the regions of interest ROI to the wireless terminals concerned (in comparison with the sole use of unicast mode). For example, the cost function F is defined as follows:

$$F = \frac{S_0}{\sum_{n=1}^{N} S_n}$$

where $S_0$ represents the size, e.g. in quantity of bits, of the overlap zone in question, and $S_n$, $\forall 1 \leq n \leq N$, represents the size, e.g. in quantity of bits, of the regions of interest ROI indexed by n.

In a step 805, the residential gateway RGW 110 checks whether the cost function is or is not below a predefined threshold TH. For example, considering the cost function F expressed above, the predefined threshold TH is fixed at 1. When the cost function F is below the predefined threshold TH, a step 806 is performed; otherwise a step 809 is performed.

In the step 806, the residential gateway RGW 110 identifies the data of the immersive image 600 to be sent to the terminals HMD1 141, HMD2 142 and HMD3 143 in the form of a transmission in multicast mode (without duplication of data). The residential gateway RGW 110 performs an encoding of said data, for example in accordance with the encoding format H.265/MPEG-4 HEVC (ISO/IEC 23008-2—MPEG-H Part 2, High Efficiency Video Coding/ITU-T H.265). Thus the tile and/or slice mechanisms make it possible to easily encode the image portions concerned, so that each of the terminals HMD1 141, HMD2 142 and HMD3 143 can autonomously decode the data that are transmitted to them (without having knowledge of the rest of the immersive image 600). The residential gateway RGW 110 identifies the destinations of said data (e.g. finds the group identifier associated with the terminals HMD1 141, HMD2 142 and HMD3, so as to be able subsequently to inform the access point AP 111 thereof.

In a step 807, the residential gateway RGW 110 identifies the data of the immersive image 600 to be sent independently to the terminals HMD1 141, HMD2 142 and HMD3 143, that is to say in the form of a transmission in unicast mode. Preferentially, the residential gateway RGW 110 adjusts each region of interest ROI by making an alignment of said region of interest ROI on boundaries of macroblocks in the immersive image 600, so that said adjusted region of interest ROI is the smallest portion of the immersive image 600 aligned on boundaries of macroblocks that encompass the actual region of interest ROI. The data corresponding to the overlap zone are excluded (since they are processed at the step 806). The residential gateway RGW 110 performs an encoding of said data, for example in accordance with the H.265/MPEG-4 HEVC encoding format. The residential gateway RGW 110 identifies the respective destinations of said data, e.g. finds the association identifiers AID attributed to the terminals HMD1 141, HMD2 142 and HMD3, so as to be able subsequently to inform the access point AP 111 thereof.

In a step 808, the residential gateway RGW 110 communicates to the access point AP 111 the data to be transmitted to the terminals HMD1 141, HMD2 142 and HMD3 143. When some of the data must be transmitted in multicast mode, the residential gateway RGW 110 indicates to the access point AP 111 which destinations, or which group of destinations, are concerned. For the data that must be transmitted in unicast mode, the residential gateway RGW 110 indicates to the access point AP 111 which destination is concerned. The algorithm in FIG. 8 is then ended, and the access point AP 111 executes the algorithm in FIG. 4.

In the step 809, the residential gateway RGW 110 identifies the data of the immersive image 600 to be send independently to the terminals HMD1 141, HMD2 142 and HMD3 143, that is to say in the form of a transmission in unicast mode. Preferentially, the residential gateway RGW 110 adjusts each region of interest ROI by effecting an alignment of said region of interest ROI on macroblock boundaries in the immersive image 600, so that said adjusted region of interest ROI is the smallest portion of the immersive image 600 aligned on the macroblock boundaries that encompasses the actual region of interest ROI. The residential gateway RGW 110 performs an encoding of said data, for example in accordance with the H.265/MPEG-4 HEVC encoding format. The residential gateway RGW 110 identifies the respective destinations of said data, e.g. finds the association identifiers AID attributed to the terminals HMD1 141, HMD2 142 and HMD3, so as to be able subsequently to inform the access point AP 111 thereof. The step 808 is next performed.

Let us consider a first set of wireless terminals that have regions of interest ROI that overlap and thus define a first overlap zone. Let us consider a second set of wireless terminals that have regions of interest ROI that overlap with each other but which do not overlap with the regions of interest ROI of the first set. In this case, the determination of the overlap zone and the calculation of the cost function are preferably done independently for each set of wireless terminals.

Let us consider a first set of wireless terminals that have regions of interest ROI that overlap and thus define an overlap zone. Let us consider a second set of wireless terminals that have regions of interest ROI that do not overlap with each other and which also do not overlap with the regions of interest ROI of the first set. In this case, the determination of the overlap zone and the calculation of the cost function are preferentially done solely for the first set of wireless terminals, and the data of the region of interest ROI of each wireless terminal of the second set are transmitted in unicast mode.

As indicated in relation to FIG. 7B, when the overlap zone of the regions of interest ROI in question is too small to allow a significant gain in bandwidth, it is possible to exclude one or more regions of interest ROI from the determination of the overlap zone being able to benefit from a transmission in multicast mode. This aspect is detailed below in relation to FIG. 9.

Figure 9:
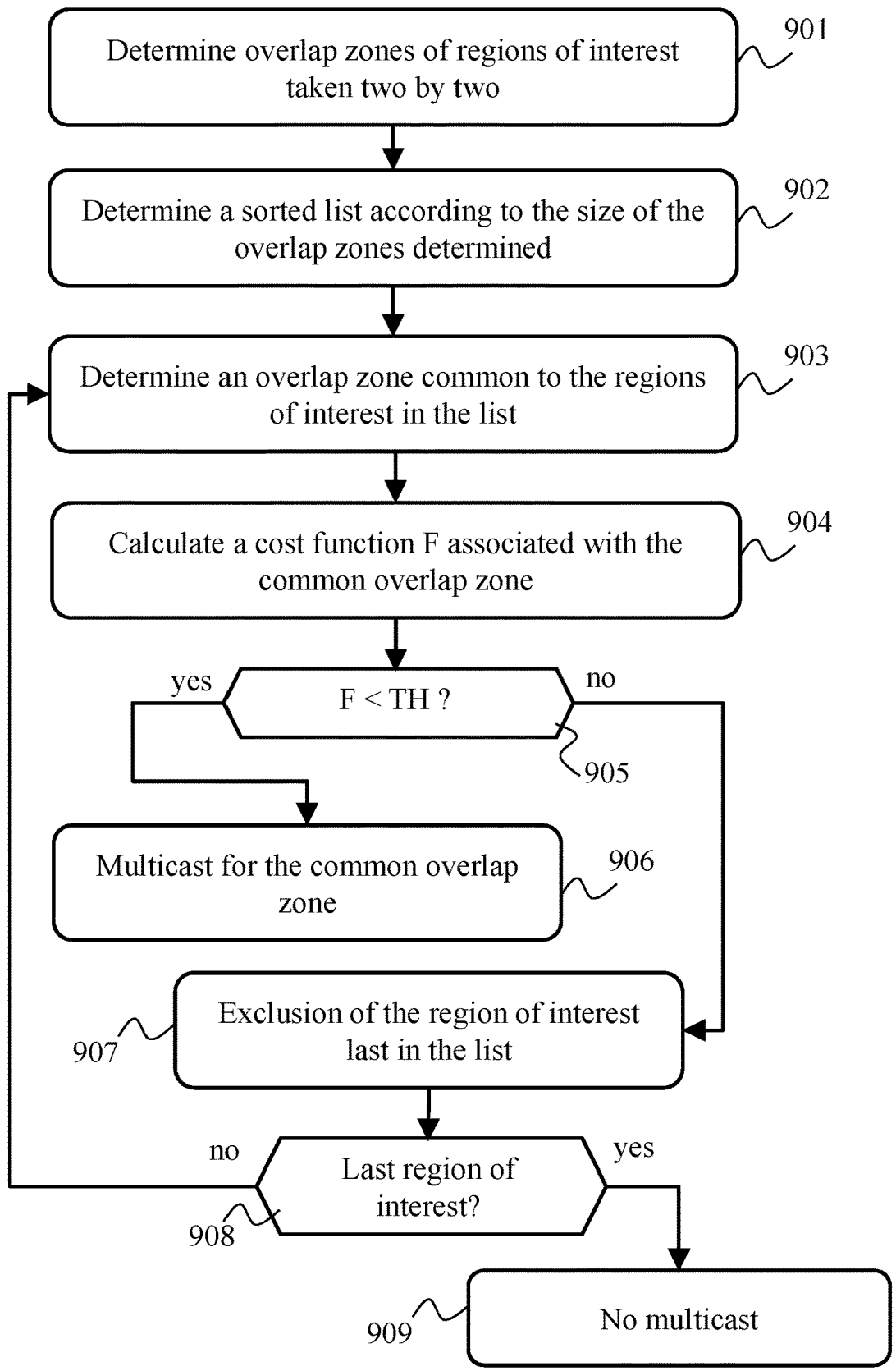
FIG. 9 illustrates schematically an algorithm for determining a suitable overlap zone for a multicast transmission, in a particular embodiment.

FIG. 9 illustrates schematically an overlap zone determination algorithm appropriate for a multicast transmission, in a particular embodiment. The algorithm in FIG. 9 is substituted for the steps 803 to 805 previously described.

In a step 901, the residential gateway RGW 110 takes the regions of interest ROI two by two and determines any overlap zone thereof.

In a step 902, the residential gateway RGW 110 determines a sorted list of regions of interest ROI according to the overlap zone determined at the step 901. The first two elements in the list have the largest overlap zone among the overlap zones determined at the step 901. Next the regions of interest ROI are sorted by successively adding to the list the region of interest ROI that has the largest overlap zone with the last element in the list.

In a step 903, the residential gateway RGW 110 determines any overlap zone common to all the regions of interest ROI present in the list.

In a step 904, the residential gateway RGW 110 calculates the cost function for the common overlap zone determined at the step 903. If no common overlap zone was able to be determined at step 903, the cost function is considered to be higher than the threshold TH.

In a step 905, the residential gateway RGW 110 checks whether the cost function F is or is not below the predefined threshold TH. When the cost function F is below the predefined threshold TH, a step 906 is performed; otherwise a step 907 is performed.

In the step 906, the residential gateway RGW 110 decides that a transmission in multicast mode is possible for the data of the common overlap zone determined at the step 903, the other data of the regions of interest ROI of the list then having to be transmitted in unicast mode, just like the data of each region of interest ROI that was excluded from the list.

In the step 907, the residential gateway RGW 110 excludes from the list the region of interest ROI listed in the last position.

In a step 908, the residential gateway RGW 110 checks whether the list contains no more than a single region of interest ROI. If such is the case, a step 909 is performed; otherwise step 903 is repeated with the list as modified at the step 907.

In the step 909, the residential gateway RGW 110 decides that no transmission in multicast mode is desirable. All the data of the regions of interest ROI are then transmitted in unicast mode.

The invention claimed is:

1. A method for transmission of a frame by an access point of a wireless local area network, the access point having implemented a phase of association with a plurality of wireless terminals, the method comprising:
receiving, by the access point, during the association phase, from each terminal of the plurality of wireless terminals, an information indicating whether each terminal of the plurality of wireless terminals are compatible with transmissions in a multicast mode;
in order to transmit the frame, the method further comprising, by the access point:
obtaining data to be transmitted in the multicast mode to a plurality of destination terminals from among each of the multicast compatible wireless terminals;
obtaining data to be transmitted in a unicast mode to at least one respective destination terminal from among the wireless terminals which are not multicast compatible or do not wish to participate in multicast;
constructing a physical-layer header including:
in a common signalling field, an identification of each channel resource intended to be used for making the frame transmission thereby indicating whether the data is to be transmitted in unicast mode or whether the data will be transmitted in multicast mode; and
in each field of a series of specific signalling fields, information representing an association between a channel resource identifier used and a unique identifier of a destination terminal concerned or of a group of destination terminals concerned, so that each destination terminal can determine each channel resource to listen to in order to receive the data that are addressed to each channel resource, whether in the unicast mode or in the multicast mode;
wherein the destination terminal or the group of destination terminals are selected from the plurality of wireless terminals.

2. The method according to claim 1, wherein, in order to make a transmission in multicast mode to of the destination terminals, the method comprises, previously performed by the access point:
receiving an instruction to create a group from a list of the destination terminals;
transmitting a group identifier to each of the destination terminals of said group;
and wherein the series of specific signaling fields is such that, in order to indicate a transmission in multicast mode on a channel resource, a single specific field is defined for said channel resource in which the group identifier is indicated.

3. The method according to claim 1, wherein the series of specific signalling fields is such that, in order to indicate a transmission in multicast mode on a channel resource, as many specific signalling fields for said channel resource are included in the physical-layer header as there are destinations of said transmission in multicast mode.

4. The method according to claim 1, wherein the physical-layer header indicates that the frame contains data transmitted in multicast mode.

5. The method according to claim 4, wherein each specific signaling field indicates there exists at least one other specific signalling field, subsequent in the physical-layer header, that is associated with the same destination terminal or with a least one destination terminal in the same group of destination terminals.

6. The method according to claim 1, wherein the access point cooperates with a device supplying virtual-reality data having an immersive image in which a plurality of users can immerse themselves by means of wireless terminals displaying respective regions of interest of said immersive image, and wherein the device supplying virtual-reality data requests the access point to transmit in the frame data corresponding to an overlap zone of said regions of interest in multicast mode and other parts of the data of said regions of interest in unicast mode.

7. The method according to claim 6, wherein the method comprises, by the device supplying virtual-reality data:
calculating a cost function relating to the overlap zone;
comparing the cost function calculated with a predefined threshold;
requesting the access point to transmit the data relating to the overlap zone in multicast mode when the cost function calculated is below the predefined threshold; and
requesting the access point to transmit the data relating to the overlap zone in unicast mode when the cost function calculated is below the predefined threshold.

8. The method according to claim 7, wherein the cost function is expressed as follows:

$$F = \frac{S_0}{\sum_{n=1}^{N} S_n}$$

where N represents the quantity of regions of interest in question, $S_0$ represents the size of the overlap zone, and $S_n$, $\forall 1 \leq n \leq N$, represents the size of the regions of interest indexed by n.

9. The method according to claim 6, wherein the device supplying virtual-reality data makes an alignment of an overlap zone on macroblock boundaries.

10. The method according to claim 6, wherein, when a first set of wireless terminals has regions of interest that overlap and define a first overlap zone and a second set of wireless terminals has regions of interest that overlap with each other but which do not overlap with the regions of interest in the first set, the device supplying virtual-reality data determines the overlap zone and calculates the cost function independently for each of the first and second sets of wireless terminals.

11. The method according to claim 6, wherein, when a first set of wireless terminals has regions of interest that overlap and define an overlap zone and a second set of wireless terminals has regions of interest that do not overlap with each other and which also do not overlap with the regions of interest of the first set, the device supplying virtual-reality data determines the overlap zone and calculates the cost function only for the first set of wireless terminals, and requests the access point to transmit, in unicast mode, the data of the region of interest of each wireless terminal in the second set.

12. The method according to claim 6, wherein the device supplying virtual-reality data performs:

taking the regions of interest two by two and determining any overlap zone thereof;

determining a sorted list of the regions of interest according to the overlap zones determined, so that a first two elements of the list have the largest overlap zone, and the regions of interest are next sorted by successively adding to the list the region of interest that has the largest overlap zone with the last element in the list;

performing at least one iteration of:

determining any overlap zone common to all the regions of interest present in the list;

calculating a cost function for the common overlap zone determined and, if no common overlap zone has been able to be determined, considering the cost function as being above a predefined threshold;

deciding that a transmission in multicast mode is possible for the data of the common overlap zone when the cost function is below the predefined threshold;

excluding from the list the region of interest iterated in the last position when the cost function is above or equal to the predefined threshold and performing a new iteration.

13. The method according to claim 6, wherein the device supplying virtual-reality data is a residential gateway.

14. The method according to claim 1, wherein the frame is transmitted by the access point in accordance with an OFDMA technique.

15. The method according to claim 1, wherein the wireless local area network is of the Wi-Fi type.

16. A non-transitory storage medium storing a computer program comprising instructions for implementing, by a processor, when said program is read and executed by said processor, the method according to claim 1.

17. An access point of a wireless local area network, the access point being adapted to perform a frame transmission in said wireless local area network, the access point having implemented a phase of association with a plurality or wireless terminals, the access point comprising:

electronic circuitry configured for receiving, during the association phase, from each terminal of the plurality of wireless terminals, an information indicating whether each terminal of the plurality of wireless terminals are compatible with transmissions in a multicast mode;

and wherein, to transmit the frame, the electronic circuitry is further configured for:

obtaining data to be transmitted in the multicast mode to a plurality of destination terminals from among each of the multicast compatible wireless terminals;

obtaining data to be transmitted in a unicast mode to at least one respective destination terminal from among the wireless terminals which are not multicast compatible or do not wish to participate in multicast;

constructing a physical-layer header including:

in a common signalling field, an identification of each channel resource intended to be used for making the frame transmission thereby indicating whether the data is to be transmitted in unicast mode or whether the data will be transmitted in multicast mode; and in each field of a series of specific signalling fields, information representing an association between a channel resource identifier used and a unique identifier of a destination terminal concerned or of a group of destination terminals concerned, so that each destination terminal can determine each channel resource to listen to in order to receive the data that are addressed to each channel resource, whether in the unicast mode or in the multicast mode;

wherein the destination terminal or the group of destination terminals are selected from the plurality of wireless terminals.

* * * * *